(12) United States Patent
Li

(10) Patent No.: US 7,215,156 B1
(45) Date of Patent: May 8, 2007

(54) DIFFERENTIAL SIGNAL DRIVER HAVING COMPLIMENTARY AND CURRENT-AIDED PRE-EMPHASIS

(75) Inventor: Zhongmin Li, Pocatello, ID (US)

(73) Assignee: AMI Semiconductor, Inc., Pocatello, ID (US)

( * ) Notice: Subject to any disclaimer, the term of this patent is extended or adjusted under 35 U.S.C. 154(b) by 149 days.

(21) Appl. No.: 11/157,403

(22) Filed: Jun. 20, 2005

(51) Int. Cl.
*H03K 19/094* (2006.01)

(52) U.S. Cl. ...................................... 326/115; 326/127

(58) Field of Classification Search ................ 326/115, 326/126, 127, 114, 29
See application file for complete search history.

(56) References Cited

U.S. PATENT DOCUMENTS

| | | | |
|---|---|---|---|
| 5,703,519 A * | 12/1997 | Crook et al. ................ | 327/387 |
| 5,726,606 A | 3/1998 | Marland ...................... | 330/302 |
| 5,995,539 A | 11/1999 | Miller ......................... | 375/222 |
| 6,313,682 B1 | 11/2001 | Muller, Jr. et al. ......... | 327/291 |
| 6,472,908 B1 | 10/2002 | Smetana ...................... | 327/52 |
| 6,507,225 B2 | 1/2003 | Martin et al. ............... | 327/108 |
| 6,522,174 B2 | 2/2003 | Martin et al. ............... | 326/115 |
| 6,570,406 B2 | 5/2003 | Tang et al. .................. | 326/86 |
| 6,704,818 B1 | 3/2004 | Martin et al. ............... | 710/100 |
| 6,870,390 B1 * | 3/2005 | Groen et al. ................. | 326/27 |
| 6,892,061 B2 * | 5/2005 | Asam ........................... | 455/313 |
| 2001/0024477 A1 | 9/2001 | Haycock ..................... | 375/296 |
| 2002/0018042 A1 | 2/2002 | Albert et al. ............... | 345/107 |
| 2002/0118042 A1 | 8/2002 | Helt et al. ................... | 326/86 |
| 2003/0006804 A1 | 1/2003 | Yang ........................... | 326/127 |
| 2003/0085736 A1 | 5/2003 | Tinsley et al. .............. | 326/81 |
| 2004/0041592 A1 | 3/2004 | Wei .............................. | 326/104 |
| 2004/0124888 A1 | 7/2004 | Radelinow ................... | 327/65 |
| 2004/0145394 A1 | 7/2004 | Nedachi ...................... | 327/112 |
| 2004/0246613 A1 | 12/2004 | Tseng ........................... | 360/1 |

* cited by examiner

*Primary Examiner*—James H. Cho
(74) *Attorney, Agent, or Firm*—Workman Nydegger

(57) ABSTRACT

A differential voltage signal (LVDS) driver circuit and/or a Current Mode Logic (CML) driver circuit. The circuit includes two current switches, each coupled to a corresponding input node. In a complementary manner, when a differential signal is applied across the input nodes, one current switch is open, while the other current switch is closed, and vice versa. A current allocation component allocates current between the two input current switches such that, when the first current switch is closed and the second current switch is open, increasing current is allocated through the first current switch and the intervening current path between the current allocation component and the first current switch, and vice versa. The circuit includes complementary pre-emphasis and/or current-aided pre-emphasis mechanisms that boost differential output transmission edges.

34 Claims, 6 Drawing Sheets

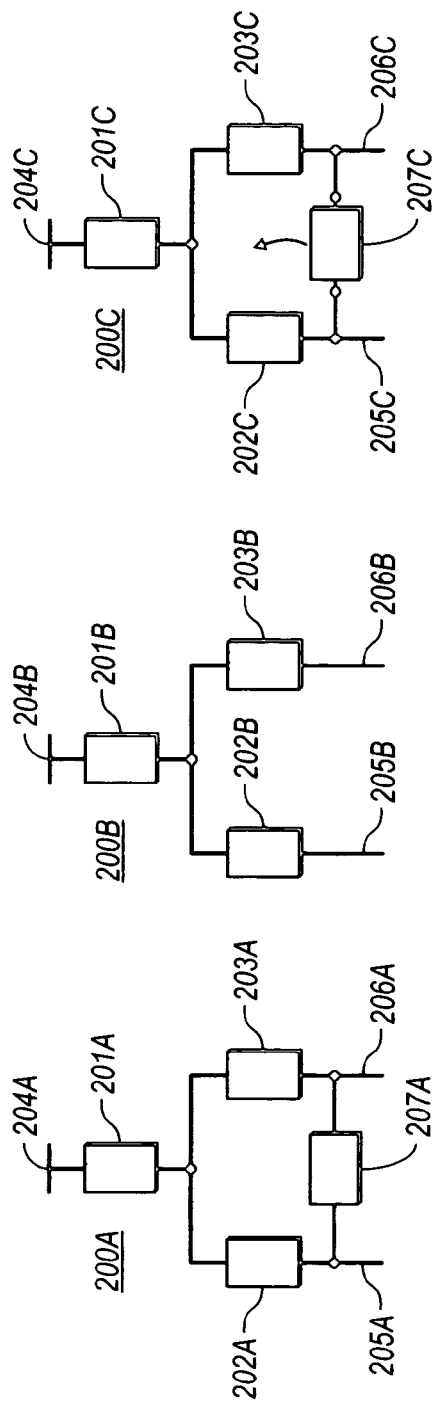
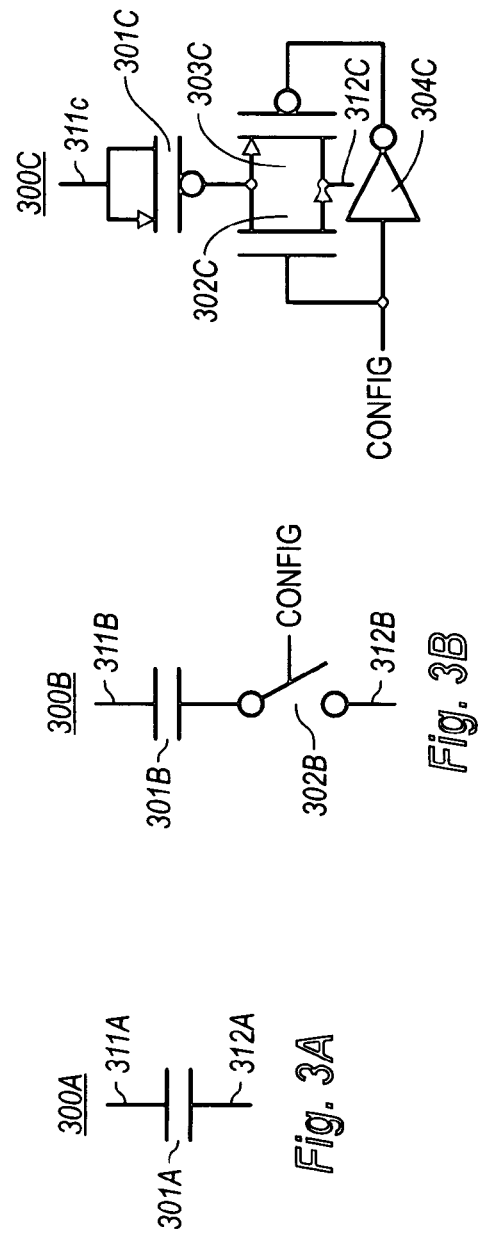

DIFFERENTIAL SIGNAL DRIVER HAVING COMPLIMENTARY AND CURRENT-AIDED PRE-EMPHASIS

CROSS-REFERENCE TO RELATED APPLICATIONS

Not applicable.

BACKGROUND OF THE INVENTION

1. The Field of the Invention

The principles of the present invention related to differential transmitter circuitry; and more specifically, to a differential signal driver that may have either or both of complimentary and current-aided pre-emphasis for faster signal transitions, and that may act as either or both of a Low Voltage Differential Signal (LVDS) driver, or a Current Mode Logic (CML) driver.

2. The Relevant Technology

Electronic circuitry provides complex functionality that is proving ever more useful. Electronic circuitry pervades our modern lives in areas such as communication, entertainment, travel, productivity, and the like. One useful circuit is the differential signal transmitter.

Differential signaling offers several advantages over single-ended signaling. One is a significant reduction in Electro Magnetic Interference (EMI). Magnetic fields induced by one differential signal path tend to cancel out with magnetic fields induced by the other differential signal path. Differential signaling is also more resistant to negative effects of common mode noise. Differential signaling has been employed for some time.

More recently, Low Voltage Differential Signaling (hereinafter also referred to as LVDS) standards have been developed to employ differential signaling at higher throughputs and lower power than more traditional differential signaling technologies. There are many driver circuits that conventionally conform to the LVDS standards. In addition, Current Mode Logic (CML) drivers are used for high speed differential signal transmission.

As the speed of LVDS and CML differential transmission increases even now into the Gigahertz range, transmission losses (such as conduction or dielectric type losses) can have significant impact upon the ability to receive and properly interpret the transmitted signal. Because of such transmission loss, the eye diagram measured at the receive end closes in due to electronic dispersion effects as the line length and data speed increase. This makes it very difficult for receivers to recover the data.

Conventional differential LVDS drivers do incorporate some pre-emphasis to allow for sharper transitions from one differential signal output polarity to the opposite differential signal output polarity. Such sharper transitions at least partially compensate for transmission losses, thereby reducing the error rate or risk of error for the transmission.

FIG. 9 illustrates a conventional LVDS driver 900 that incorporates pre-emphasis. N-type Metal Oxide Semiconductor (NMOS) Field Effect Transistor (FET) 906 is a current source biased by input signals 901 (NB). The output differential voltage between output nodes 915 (PADMN) and 916 (PADMP) is a sum of two voltage drops: one across resistor 908 and one across resistor 909. By switching node 902 (RISE) and 903 (FALL) in the opposite direction, the direction of the current flowing through the two resistors is reversed, which changes the polarity of the differential voltage between output nodes 915 and 916.

For example, when the input voltage on node 902 is high (with the complementary voltage on 903 being low), NMOS FET (NFET) 914 is on and NFET 907 is off. In that case, current flows from supply 913 through resistors 912, 910, 908 and 909, NFET 914 and current source 906, and sinks into ground 905. The current creates a positive differential across output nodes 916 and 915. Conversely, when the input voltage on node 902 is low (with the complementary voltage on 903 being high), a negative differential is created between node 916 and node 915.

The differential voltage Vd across nodes 916 and 915 is equal to the effective resistance across those two output nodes multiplied by the current set by the bias NFET 906. Usually the effective differential resistance across nodes 916 and 915, which is determined by the values of resistors 908 through 912, needs to match the impedance of the transmission line. Thus, the effective differential resistance should not change significantly. Therefore, the differential output voltage Vd and its transition rate (also referred to as "edge rate") is dependent only upon the bias current as the effective resistance is or needs be a constant. More specifically, the bias current (and thus the differential output voltage Vd) is dependent upon the size of the NFET 906 in a low voltage case such as this when the over drive voltage of the NFET 906 should be at relatively small value to keep it in saturation region with minimal drain to source voltage overhead.

As previously mentioned, as the transmitted differential signal travels through the transmission channel to the receiver, there is high dielectric transmission loss for high frequency components of the transmitted signals. To compensate for this, the LVDS driver circuit 900 has a pre-emphasis component for sharpening the edge transition. Specifically, this may be done by having a larger bias current thereby reducing switching time.

This cannot be accomplished by increasing the size of the NFET 906, since that would result in an increase in the steady state differential voltage. This could violate standards such as CML, and in particular low voltage standards such as LVDS. The lower voltage swing is one of the main grounds why LVDS or CML can operate at much higher speed than standard CMOS driver in the first place.

Typical implementation of the prior art on pre-emphasis is realized using NFET 918 and pre-emphasis signal 917 as shown in FIG. 9. The technique shown is what is being called current-assistant method. This method relies on turning-on the additional bias NFET 918 for just a short period time during the transition of the output from high to low or from low to high. The addition bias current gives a burst of higher driving current for this short period of time, and therefore boosts the edge of output waveform without an increase in static voltage swing. Dynamically, the voltage swing will have some overshoot or undershoot right after its transition completes and before it is completely settled out.

In this conventional technology, it is important to line up the controlling pulse 917 for pre-emphasis with the switching signals RISE 902 and FALL 903, to achieve edge emphasis during transition, and not distortion for steady state, of the output signal 915 and 916. This requires that the pre-emphasis signal should not arrive at node 917 before the data signals arrive at nodes 902 or 903. It is also important for the pre-emphasis signal 917 to conclude and thus turn off the transistor 918 before the signals at the output nodes 915 and 916 complete their transitions in order not to overshoot or undershoot the output signals.

Accordingly, what would be advantageous is a differential voltage signal driver circuit (such as a LVDS) driver circuit, or a Current Mode Logic (CML) driver circuit that operates at low voltage, and that uses effective pre-emphasis techniques that have controlled mechanisms for sharpening the transition of the differential output waveform, thereby facilitate higher data rate applications.

BRIEF SUMMARY OF THE INVENTION

The principles of the present invention relate to a circuit that may be either a voltage signal driver circuit such as a Low Voltage Differential Signaling (LVDS) driver circuit, or perhaps even a Current Mode Logic (CML) driver circuit.

The circuit includes two current switches, each coupled to a corresponding input node. In this description and in the claims, a "current switch" is any component that selectively connects and disconnects two circuit nodes and regulates the maximum current flowing through those two nodes when it is closed in response to a control signal. In a complementary manner, when a differential signal is applied across the input nodes, one current switch (hereinafter referred to as a "first" current switch) is open, while the other current switch (hereinafter referred to as a "second" current switch) is closed. Which current switch is closed, and which is open, depends on the polarity of the applied differential input signal.

A current allocation component allocates current between the two input current switches such that, when the first current switch is closed and the second current switch is open, increasing current is allocated through the first current switch and the intervening current path between the current allocation component and the first current switch. The current allocated to the first current switch increases until it reaches a state in which more current passes through the first current switch than the second current switch. Conversely, when the second current switch is closed and the first current switch is open, increasing current is allocated through the second current switch and the intervening current path until the current reaches a state in which more current passes through the second current switch than the first current switch. One differential output node (hereinafter also referred to as a "first" differential output node) is in the first current path, and the other differential output node (hereinafter also referred to as a "second" differential output node) is in the second current path.

When operating in the differential voltage signal driver mode, the current allocation component includes a resistor coupled between the two differential output nodes. When operating in the current mode logic driver mode, the current allocation component does not include a resistor between the two differential output nodes. The circuit may be either the differential voltage signal driver or the current mode logic driver, and, unlike conventional circuits, may be configurable to switch between the two as desired.

In contrast to conventional differential voltage signal driver circuits and current mode logic driver circuits (hereinafter collectively referred to as "conventional driver circuits"), the circuit described includes one or both of a complementary pre-emphasis mechanism, and a current-aided pre-emphasis mechanism, that allows for rapid transition of the differential output signal from one polarity to the opposite polarity. This rapid transition is especially advantageous in compensating for transmission loss in high date rate applications.

The complimentary pre-emphasis mechanism includes one or more capacitive coupling mechanism that may be coupled between the differential output terminal of one polarity (e.g., high) and the differential input terminal of the opposite polarity (e.g., low). As explained further below in the detailed description, this significantly boosts the transition from one differential output state to the opposite differential output state. Similar capacitive coupling mechanisms may be used between the low differential output terminal and the high differential input terminal, thereby boosting transitions for both differential signals. In one embodiment, there are a number of capacitive coupling mechanisms on each leg. Each capacitive coupling mechanism may be configured to selectively capacitively couple as appropriate to attain the desired transition edge. Accordingly, the complimentary pre-emphasis may be programmable.

The current-aided pre-emphasis mechanism includes a first current-aided pre-emphasis component coupled to one of the differential output nodes, and configured to have allocated current of the current allocation component during at least a portion of the time that the current allocation component is increasing current allocated through the first current path and through the first current switch. Likewise, another current-aided pre-emphasis component may be coupled to the opposite differential output node, and may be configured to have allocated current of the current allocation component during at least a portion of the time that the current allocation component is increasing current allocated through the second current path and through the second current switch. This further has the effect of sharpening the differential output signal transition edge.

Accordingly, the principles of the present invention enable either a differential voltage driver circuit or a current mode driver circuit that has a sharper transition edge, thereby enabling fast data rates. These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2A illustrates one embodiment of a current allocation component of FIG. 1A or 1B that allows the circuit of FIG. 1A or 1B to act as a differential voltage signal driver circuit;

FIG. 2B illustrates a second embodiment of a current allocation component of FIG. 1A or 1B that allows the circuit of FIG. 1A or 1B to act as a current mode logic driver circuit;

FIG. 2C illustrates a third embodiment of a current allocation component of FIG. 1A or 1B that allows the circuit of FIG. 1A or 1B to act as a universal differential voltage signal driver circuit and current mode logic driver circuit;

FIG. 3A illustrates a capacitive coupling mechanism that may serve as any of the capacitive coupling mechanisms of the circuit of FIG. 1A or 1B;

FIG. 3B illustrates a second capacitive coupling mechanism that may serve as any of the capacitive coupling mechanisms of the circuit of FIG. 1A or 1B;

FIG. 3C illustrates a third capacitive coupling mechanism that may serve as any of the capacitive coupling mechanisms of the circuit of FIG. 1A or 1B;

DETAILED DESCRIPTION OF THE PREFERRED EMBODIMENTS

The principles of the present invention relate to a circuit that may behave as either or both of a differential voltage signal driver circuit (such as a Low Voltage Differential Signaling (LVDS) driver circuit), or as a Current Mode Logic (CML) driver circuit. As will be described hereinafter, the circuit includes complementary pre-emphasis and/or current-aided pre-emphasis mechanisms that boost differential output transmission edges.

Figure 1A:
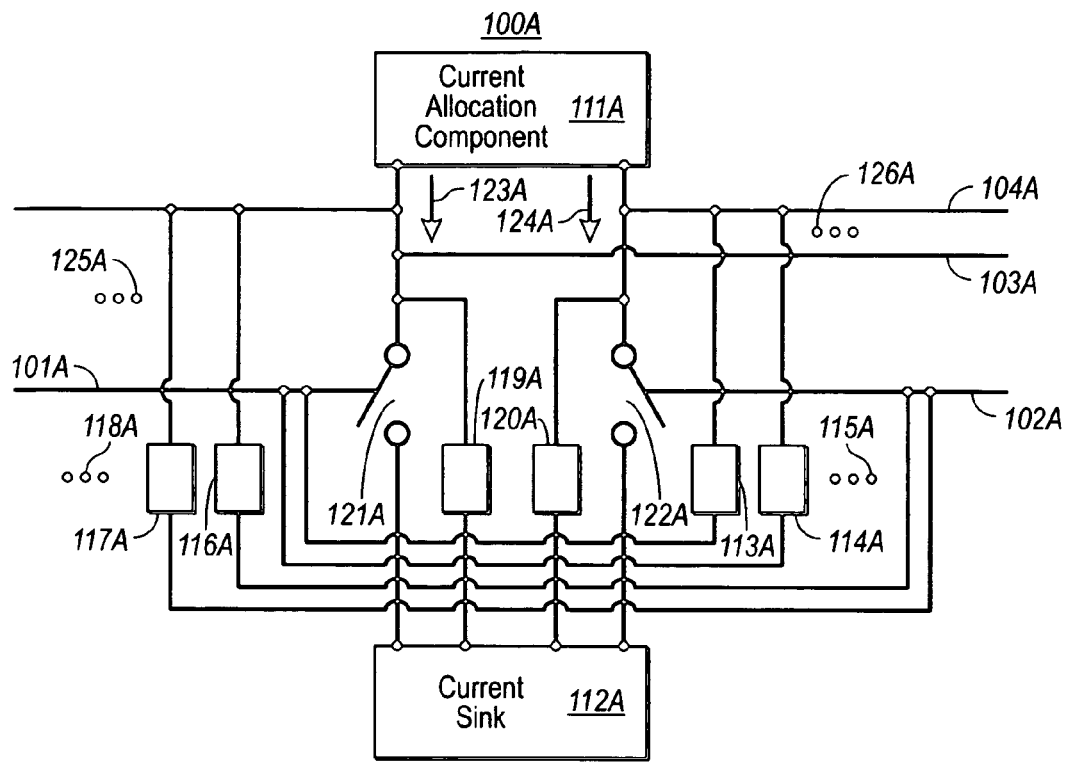
FIG. 1A illustrates a differential voltage signal driver circuit or current mode logic driver circuit in accordance with a first general embodiment of the present invention.

FIG. 1A illustrates a circuit 100A that may behave as a differential voltage signal driver circuit or a current mode logic driver circuit. The circuit 100A includes differential input nodes 100A and 102A, and differential output nodes 103A and 104A. Some or all of these nodes may be I/O terminals for a chip, although that need not be the case. For instances, nodes 100A and 102A may be input terminals on a chip, whereas nodes 103A and 104A may be output terminals on the chip.

The circuit 100A includes two current switches 121A and 122A. In this description and in the claims, a "current switch" is any component that selectively connects and disconnects two circuit nodes and regulates the maximum current flowing through those two nodes when it is closed in response to a control signal. The first current switch 121A is controllably coupled to the first differential input node 101A. The second current switch 122A is controllably coupled to the second differential input node 102A. In this description and in the claims, the use of the terms, "first", "second", "third", "fourth" and so forth, unless otherwise specified, does not imply any sequential or positional ordering, but only to distinguish one item from another. Furthermore, the term "controllably coupled" when referring to the coupling between a switch and a circuit node means that if a control signal is present on the circuit node, the switch is controlled by the control signal.

In this configuration, the current switches 121A and 122A open and close in a complementary fashion. In particular, if a differential input signal having one polarity is applied across the input terminals 101A and 102A, the first current switch 121A is closed while the second current switch 122A is open. Furthermore, if the differential input signal has the opposite polarity, the first current switch 121A is open while the second current switch 122A is closed. In this description and in the claims, the term "polarity" when applied to a differential signal identifies which of the two component signals of the differential signal is higher.

The circuit 100A includes a current allocation component 111A that is coupled to the current switches 121A and 122A. The current allocation component 111A allocates current between the current switches 121A and 122A. In this description and in the claims, the term "allocation" when referring to current means to either provide current to at least two different current paths, or draw current from at least two different current paths, where the amount of current provided or drawn for any given current path changes over time. "Current allocation" does not imply that the total current provided or drawn need be constant. In fact, even slight changes in voltage supply levels may cause some variance in the amount of current provided or drawn by the current allocation component.

The current allocation component 111A is configured such that increasing current is allocated through the first current switch and current path 123A between the current allocation component 111A and the first current switch 121A when the first current switch 121A is closed and the second current switch 122A is open until the current allocated through the first current switch 121A reaches a state in which more current passes through the first current switch 121A than the second current switch 122A. Likewise, increasing current is allocated through the second current switch 122A and a second current path 124A between the current allocation component 111A and the second current switch 122A when the second current switch 122A is closed and the first current switch 121A is open until the current passing through the second current switch 122A reaches a state in which more current passes through the second current switch 122A than the first current switch 121A. In other words, when current switch 121A closes, the current passing through current switch 121A increases while the current passing through current switch 122A decreases until the current passing through current switch 121A levels out at a level that is more than the current passing through current switch 122A. Similarly, when current switch 122A closes, the current passing through current switch 122A increases while the current passing through current switch 121A decreases until the current passing through current switch 122A levels out at a level that is more than the current passing through current switch 121A.

The first differential output terminal 103A is in the first current path 123A, and the second differential output terminal 104A is in the second current path 124A. The remaining components of the circuit 100A of FIG. 1A will be described subsequent to a description of FIG. 2A.

The circuit 100A may behave as a differential voltage driver circuit and/or a current mode logic driver circuit, depending on the configuration of the current allocation component 111A. FIGS. 2A through 2C illustrate various possible configurations for the current allocation component 111A of FIG. 1A.

For instance, the current allocation component 200A of FIG. 2A permits the circuit 100A to behave as a differential voltage signal driver circuit. A first resistor 202A has an upper terminal at least indirectly coupled to a voltage source 204A (in the illustrated case of FIG. 2A through resistor 201A to voltage source Vdd). The use of the term "upper"

when describing a terminal is only to more easily refer the reader to the circuit drawings, and is not intended to refer to any actual position of the terminal in the physical circuit layout. The resistor may be a single resistor, or a network of parallel and/or serial resistors. The resistor 202A has a lower terminal coupled to circuit node 205A from which the current may be provided along current path 123A of FIG. 1A.

Resistor 203A has an upper terminal at least indirectly coupled to the voltage source 204A (in the illustrated case of FIG. 2A through the resistor 201A to the voltage source Vdd). The lower terminal of the resistor 203A is coupled to circuit node 206A from which the current may be provided along current path 124A of FIG. 1A.

In the embodiment of FIG. 2A, a fourth resistor 207A is illustrated coupled between the nodes 205A and 206A, which would be coupled to differential output nodes 103A and 104A. Referring back to FIG. 1A, the current sink 112A may be a simple supply voltage such as ground.

The portions of the circuit 100A described up to this point in the description are quite similar to the prior art low voltage differential signal (LVDS) driver circuit 900A described above. Specifically, if the current switch 121A is closed, if the current switch 122A is open, if the current is in steady state, and if the portions of the circuit not yet described are ignored for now, current passes from supply 204A, through resistors 201A, 203A and 207A, through current switch 121A and into current sink 112A. This causes a negative voltage differential to be generated across resistor 207A (i.e., the voltage at node 205A is lower than the voltage at node 206A) creating a differential output voltage having one polarity.

At some instant, the current switch 122A will close, and the current switch 121A will open. Before reaching steady state, the differential output voltage will be in transition. More specifically, at the immediate point that the current switch 122A is closed, the current passing from right to left through resistor 207A decreases (decreasing the negative voltage differential across the differential output terminals 103A and 104A). Ultimately, the current will reach zero, and then reverse direction from left to right. In that condition, the current passes from voltage supply 204A through resistors 201A, 202A and 207A, current switch 122A and into the current sink 112A. The voltage differential across resistor 207A is reflected in a positive voltage differential across the differential output terminals 103A and 104A (i.e., the voltage at output terminal 103A is higher than the voltage at output terminal 104A). Ultimately, the current passing through resistor 207A will reach a steady state thereby stabilizing the positive output voltage at a certain level.

Subsequently, in order to transition the other way, the current switch 121A will close, and the current switch 122A will open once again. Before reaching steady state, the differential output voltage will be in transition. More specifically, at the immediate point that the current switch 121A is closed, the current passing from left to right through resistor 207A decreases (decreasing the positive voltage differential across the differential output terminals 103A and 104A). Ultimately, the current will reach zero, and then reverse direction from right to left. In that condition, the negative output voltage differential will become more and more negative until the current passing through resistor 207A reaches a steady state thereby stabilizing the negative output voltage at a certain level and returning to the starting point of this description.

The transition of the differential output signal from one polarity to another can take significant time for faster data rate applications. The circuit 100A uses effective pre-emphasis techniques that will now be described with respect to FIGS. 1A and 2A. The pre-emphasis allows for significant sharpening of the transition edge. Specifically, the circuit 100A employs two forms of pre-emphasis called herein "complimentary pre-emphasis" and "current-aided pre-emphasis", which will now be described in that order.

The complimentary pre-emphasis mechanism includes one or more capacitive coupling mechanisms that at least selectably capacitively couple one differential output terminal to an opposite differential input terminal. In this description and in the claims, "at least selectably capacitively coupling" between two circuit nodes means that the circuit nodes are either capacitively coupled, or are selectably capacitively coupled. In this description and in the claims, "capacitive coupling" between two circuit nodes means that the two nodes are not directly connected, but are connected through a capacitor. In this description and in the claims, a capacitor may be a single capacitor, or a network of capacitors in series and or in parallel. In this description and in the claims, "selectably capacitively coupling" between two circuit nodes means that the two circuit nodes are capacitively coupled through a closed switch if a configuration signal provided to the switch causes the switch to be closed.

Referring back to FIG. 1A, the capacitive coupling mechanisms 116A and 117A at least selectably capacitively couple the first differential output node 103A and the second differential input node 102A. Although two such capacitive coupling mechanisms 116A and 117A are shown in FIG. 1A, a circuit in accordance with the principles of the present invention may have any number (even zero) of such capacitive coupling mechanism. The flexibility in the number of capacitive coupling mechanism at least selectably capacitively coupling the first differential output terminal 103A and the second differential input terminal 102A is represented using the horizontal ellipses 118A and 125A. The capacitive coupling mechanism 116A, 117A and 118A may collectively be referred to as "left leg" capacitive coupling mechanisms, simply due to their placement in the circuit diagram of FIG. 1A.

The capacitive coupling mechanisms 113A and 114A at least selectably capacitively couple the second differential output node 104A and the first differential input node 101A. Although two such capacitive coupling mechanisms 113A and 114A are shown in FIG. 1A, a circuit in accordance with the principles of the present invention may have any number (even zero) of such capacitive coupling mechanism. The flexibility in the number of capacitive coupling mechanism at least selectably capacitively coupling the second differential output terminal 104A and the first differential input terminal 101A is represented using the horizontal ellipses 115A and 126A. The capacitive coupling mechanism 113A, 114A and 115A may collectively be referred to as "right leg" capacitive coupling mechanisms, simply due to their placement in the circuit diagram of FIG. 1A. The use of the terms "left" and "right" in this context does not imply any actual physical positioning of the capacitive coupling mechanism in any actual physical circuit.

The capacitive coupling mechanisms, if they actually capacitively couple, contribute to significant sharpening in the differential transition. Specifically, suppose current switch 121A is closed, and current switch 122A is open, and the differential voltage on the output nodes 104A and 103A is in steady state. In that state, there will be a negative voltage differential across the output nodes 103A and 104A (i.e., the voltage on output node 103A is lower than the voltage on output node 104A). Furthermore, the voltage applied to the current switch 121A is high, while the voltage applied to current switch 122A is low.

Now suppose that a transition is to occur. To initiate the transition, the voltage applied to the first input node 101A is suddenly turned low, opening the current switch 121A. In contrast, the voltage applied to the second input node 102A is suddenly turned high, closing the current switch 122A. Without any capacitive coupling mechanism, the current through the current switch 122A would gradually increase, causing the voltage at the output node 104A to decrease, while increasing the voltage at the output node 103A during the transition.

To supplement the transition, however, the positive voltage change at the input node 102A will be reflected in a positive voltage boost at the output node 103A through the left leg capacitive coupling mechanisms 116A, 117A and 118A. The transition is also accelerated for the output node 104A through the negative voltage change at the input node 101A being capacitively received by the output node 104A through the right leg capacitive coupling mechanisms 112, 113 and 114. In a similar manner, the left leg capacitive coupling mechanisms serve to provide a negative voltage boost to the output node 103A when transitioning low, while the right leg capacitive coupling mechanisms serve to provide a positive voltage boost to the output node 104A when transitioning high.

If the amount of capacitive coupling is too low, then the transition speed will not be as fast as it could be. If the amount of capacitive coupling is too high, then the transition slope will be too sharp causing overshoot, and additional settling time. Somewhere in between, there is an ideal amount of capacitive coupling that minimizes the total transition time. To achieve a low transition time, therefore, at least some (or even all) of the capacitive coupling mechanisms may be programmable so that an appropriate number of capacitive coupling mechanisms are selected to capacitively couple. If it is known that a certain number of capacitive coupling mechanisms will surely be needed regardless, then those certain number of capacitive coupling mechanisms may be hardwired to capacitively couple.

FIG. 3A illustrates an embodiment 300A of a capacitive coupling mechanism in which there is hardwired capacitive coupling in which a capacitor 301A has one terminal (e.g., terminal 311A) coupled to the corresponding differential output node, while the other terminal (e.g., terminal 312A) is coupled to the opposite differential input node.

FIG. 3B illustrates an embodiment 300B of a capacitive coupling mechanism in which the capacitive coupling is selectable in response to a configuration signal CONFIG. Specifically, if the signal CONFIG is low, the switch 302B is open, thereby disabling the capacitive coupling. If the signal CONFIG is high, the switch 302B is closed, which connects the lower terminal of capacitor to circuit node 312B. The circuit node 311B or 312B is connected to the corresponding output node, while the other circuit node 312B or 311B is connected to the opposite input node.

FIG. 3C illustrates an embodiment 300C of a capacitive coupling mechanism in which the capacitive coupling is also selectable. In this case, the capacitor 301C is a Metal Oxide Semiconductor (MOS) capacitor, and the switch is implemented using the combination of an n-type MOS Field Effect Transistor (nMOSFET) 302C and a p-type Field Effect Transistor (pMOSFET) 303C. The gate terminals of the MOSFETs 302C and 303C are biased by the respective input and output terminals of an inverter 304C. In this configuration, the switch conducts regardless of the voltage at either side of the switch, so long as the configuration signal CONFIG is high. If the configuration signal CONFIG is low, the switch is effectively open, thereby disabling the capacitive coupling. The various capacitors of the capacitive coupling mechanism may have the same capacitance, may have capacitances sized in binary configuration, or may have any other sizing as desired to obtain as close to an ideal capacitive coupling as possible.

The second form of pre-emphasis used by the circuit 100A is current-aided pre-emphasis. The current-aided pre-emphasis may be used as the sole source of pre-emphasis (as when the capacitive coupling mechanisms are not present or are all configured to be disabled), or in addition to the complimentary pre-emphasis just described.

The current-aided pre-emphasis may be implemented in the circuit 100A using the current-aided pre-emphasis components 119A and 120A. Specifically, the current-aided pre-emphasis component 119A is coupled to the first differential output node 103A and is configured such that the current allocation component 111A allocates current through the first current-aided pre-emphasis component 119A during at least a portion of the time that the current allocation component is increasing current allocated through the first current path 123A and through the first current switch 121A. The second current-aided pre-emphasis component 120A is coupled to the second differential output node 104A and is configured such that the current allocation component 111A allocates current through the second current-aided pre-emphasis component 120A during at least a portion of the time that the current allocation component 111A is increasing current allocated through the second current path 124A and through the second current switch 122A.

Figure 9:
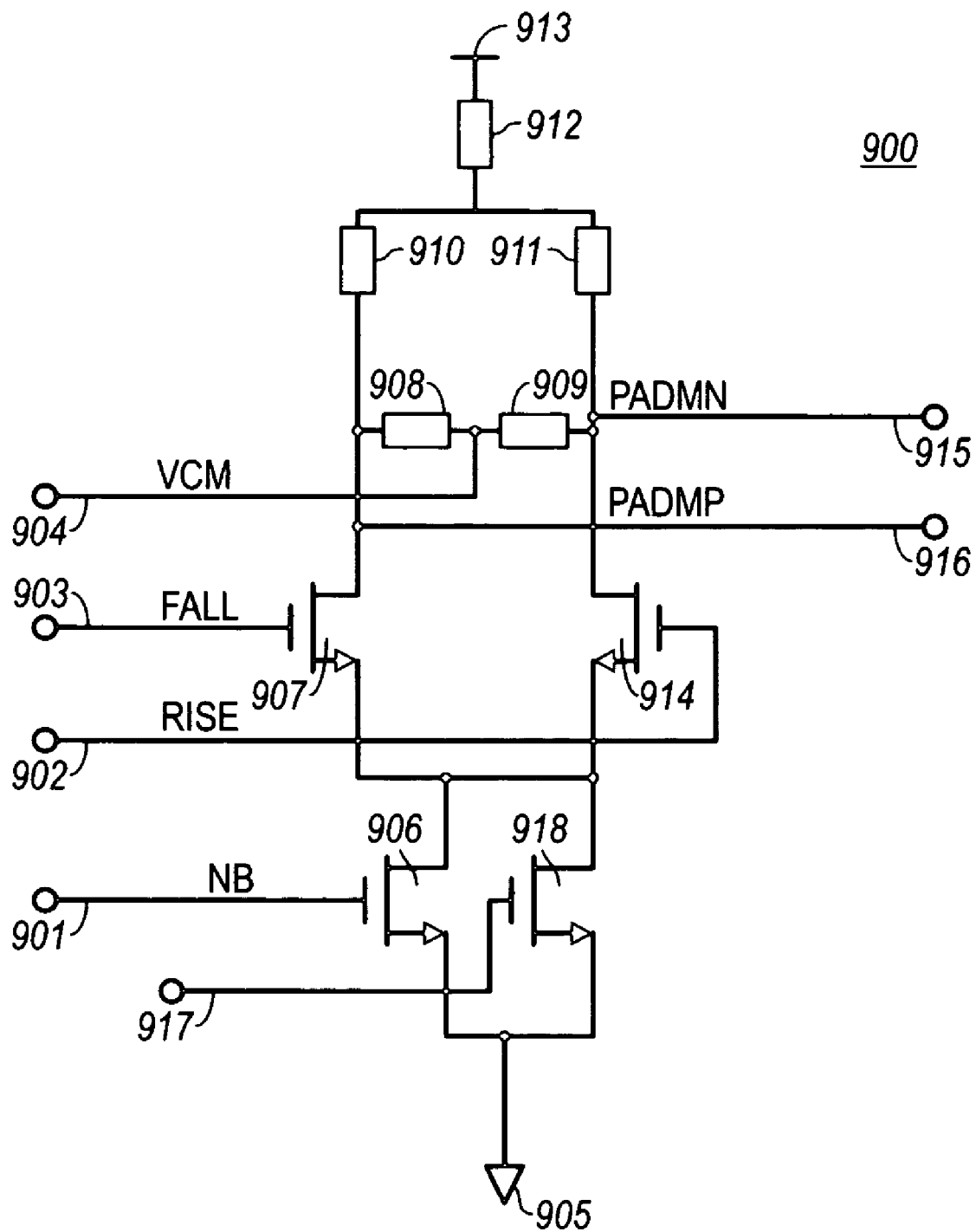
FIG. 9 illustrates a Low Voltage Differential Signal (LVDS) driver circuit having current-aided emphasis for sharper transitions in accordance with the prior art.

Since the current-aided pre-emphasis components (119A and 120A) are only activated to draw current while the corresponding current switch (121A and 122A, respectively) is closed, the transition is boosted. This current-aided pre-emphasis has some improved performance over the current-aided pre-emphasis described above with respect to the prior art circuit 900 of FIG. 9. Specifically, referring to FIG. 9, suppose the current-aided pre-emphasis enable signal on node 917 arrives just before the switching signals FALL and RISE are switched. In FIG. 9, this would cause the differential output voltage to increase, thereby increasing transition time. Now referring to FIG. 1A, suppose that the current-aided pre-emphasis component 119A is caused to draw current from node 103A just before the switching signal causes the current switch 121A to close. In that case, the high voltage on output node 103A would be caused to decrease slightly. This would only reduce the differential output voltage thereby shortening the transition time. This reduction would not be too harmful since the current-aided pre-emphasis component 119A would not be enabled too much before the current switch 121A closes, and thus would only shorten the steady state period marginally. A similar analysis applies if the current-aided pre-emphasis component 120A is activated slightly before the current switch 122A is closed. In that state as well, the premature enablement would only cause the high voltage at output node 104A to be decreased slightly, thereby shortening the transition time.

Figure 1B:
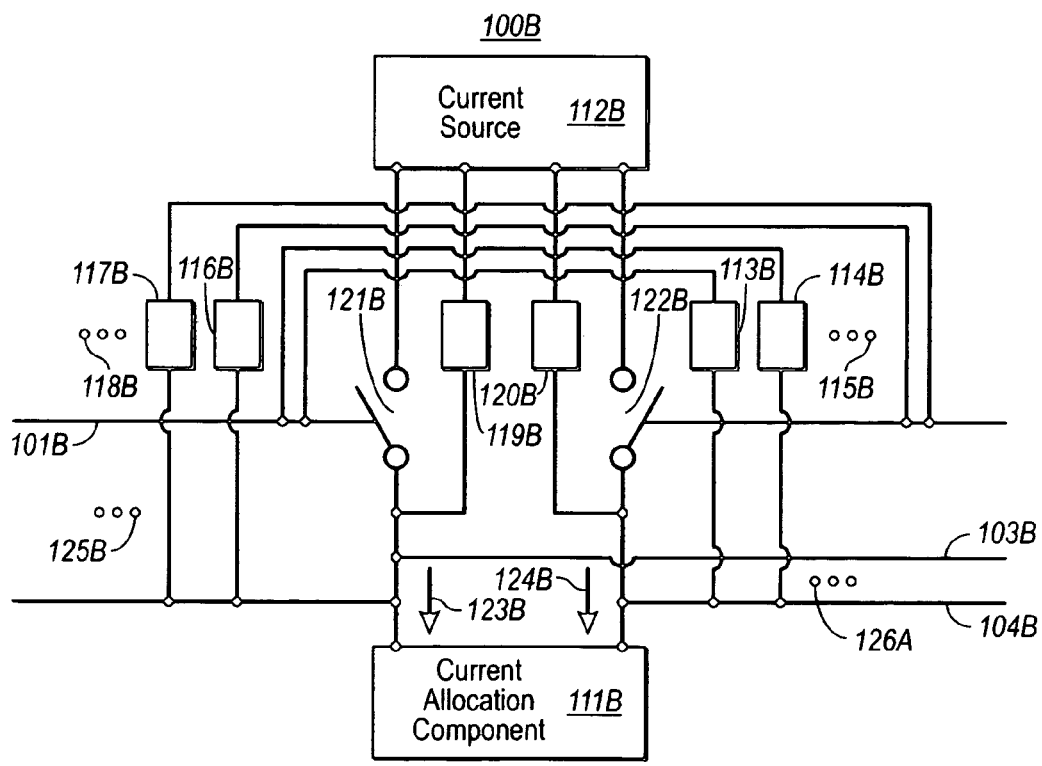
FIG. 1B illustrates a differential voltage signal driver circuit or current mode logic driver circuit in accordance with a second general embodiment of the present invention.

FIG. 1A illustrates a circuit 100A in which the current allocation component 111A provides current along two different current paths 123A and 124A. However, FIG. 1B illustrates a circuit 100B in which the current allocation component 111B draws current along two different current paths 123B and 124B. The components 1011B through 126B of FIG. 1B are similar to the respective components 101A through 126A of FIG. 1A, except that current source 112B sources current along the current paths 123B and 124B as dictated by the current allocation component 111B. Furthermore, the current-aided pre-emphasis components 1199B and 120B provide pre-emphasis by sourcing current from current source 112B, rather than drawing current into a current sink. The current allocation component in accordance with the principles of the present invention may also allocate current by using resistances at both the current sourcing side, and the current sinking side. For instance, the current allocation component 200A may also serve as the current sink 112A of FIG. 1A.

If the current allocation component 200A of FIG. 2A is used as the current allocation component 111A of FIG. 1A with the voltage source 204A being a high voltage supply, the circuit 100A provides an effective differential voltage signal driver circuit that may conform with Low Voltage Differential Signal (LVDS) specifications. Similarly, if the current allocation component 200A of FIG. 2A is used as the current allocation component 111B of FIG. 1B with the voltage source 204A being a low voltage supply, the circuit 100B is an effective LVDS driver circuit.

However, the circuits 100A and 100B are not limited to differential voltage signal driver circuits. The circuits 100A and 100B may instead act as current mode logic driver circuits using the current allocation component 200B of FIG. 2B. Specifically, the resistor 202B has an upper terminal at least indirectly coupled to a voltage source 204B (coupled through resistor 201B in the illustrated embodiment of FIG. 2B), and a lower terminal 205A through which current is allocated along one current path. The resistor 203B has an upper terminal at least indirectly coupled to the voltage source 204B (coupled through resistor 201B in the illustrated embodiment of FIG. 2B), and a lower terminal 206A through which current is allocated along the second current path. The voltage source 204A is a high voltage supply if the current allocation component 200B acts as the current allocation component 111A of FIG. 1A, and is a low voltage supply if the current allocation component 200B acts as the current allocation component 111B of FIG. 1B. In either case, a signal is applied to the differential output terminals in the form of a differential current, rather than a differential voltage.

FIG. 2C illustrates an embodiment 200C of a current allocation component that supports both a differential voltage signal driver circuit and a current mode logic driver circuit. Specifically, when the switched resistor 207C is closed, the resistors 201C, 202C, 203C, 207C and circuit nodes 204C, 205C and 206C behave as described above for FIG. 2A for the respective resistors 201A, 202A, 203A, 207A, and circuit nodes 204A, 205A and 206A, to thereby implement a differential voltage signal driver circuit. In contrast, when the switched resistor 207C is open, the resistors 201C, 202C and 203C, and circuit nodes 204C, 205C and 206C behave as described above for FIG. 2B for the respective resistors 201B, 202B, 203B, and circuit nodes 204B, 205B and 206B, to thereby implement a current mode logic driver circuit. The complimentary and current-aided pre-emphasis works well for both the differential voltage signal driver circuit and the current mode logic driver circuit.

Figure 4:
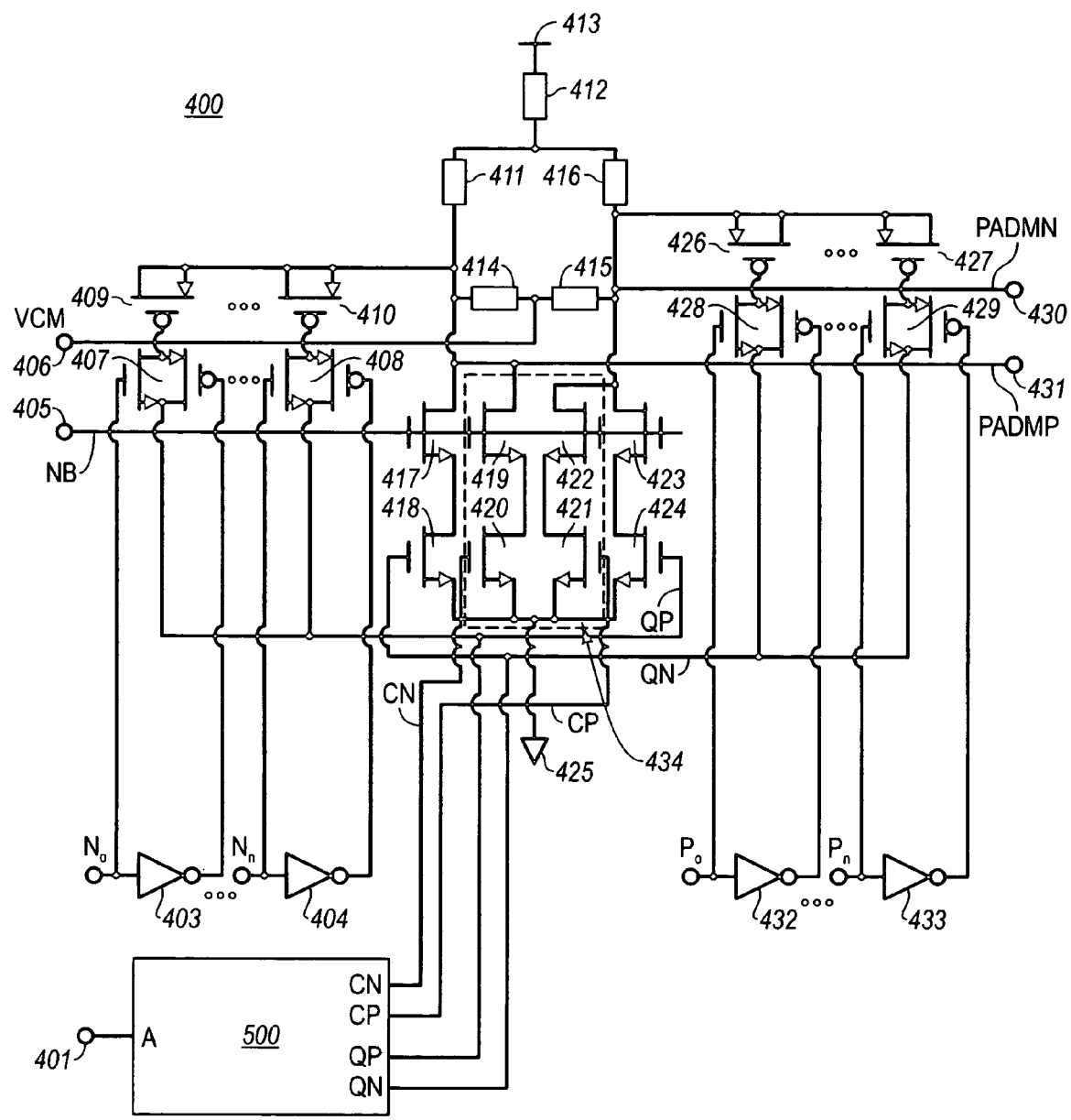
FIG. 4 illustrates a detailed circuit diagram of an embodiment of the driver circuit of FIG. 1A.

FIG. 4 illustrates a specific circuit diagram of an LVDS driver circuit 400 that is an embodiment of the circuit 100A of FIG. 1A, with the current allocation component 111A being the current allocation component 200A of FIG. 2A, and with the current sink 112 being a ground voltage supply. Furthermore, the capacitive coupling mechanisms use the configuration 300C shown in FIG. 3C, in which the signals $N_0$ through $N_n$ and $P_0$ through $P_n$, represent respective configuration signals for the capacitive coupling mechanism. The signals QN and QP represent the differential input signal, and the signals PADMN and PADMP represent the differential output signals. The differential input signals QN and QP are generated by the pre-driver circuit 500. One of the current-aided pre-emphasis components is represented by the series combination of nMOSFETs 419 and 420. The other of the current-aided pre-emphasis components is represented by the series combination of nMOSFETs 421 and 422. The current switches are represented by nFETs 418, 417, 423 and 424. The nFETs 417, 419, 422 and 423 are biased by a voltage NB that is sufficient to keep the nFETs in the saturation region, thereby causing the nFETs 417, 419, 422 and 423 to shield transient switching fluctuations of current and/or voltage at the respective nFETs 418, 420, 421 and 424 from degrading the differential output signal. The bias voltage NB also sets the maximum drain currents of nFETs 418, 420, 421 and 424.

The following Table 1 relates component(s) of FIG. 4 and a corresponding component of FIG. 1A or FIG. 2A for which the component(s) is an example.

TABLE 1

Relation of FIG. 4 to FIGS. 1A and 2A

| Component(s) of FIG. 4 | Example of component of FIGS. 1A/2A |
|---|---|
| 413 | 204A |
| 412 | 201A |
| 411 | 202A |
| 416 | 203A |
| 414 and 415 | 207A |
| 430 | 104A |
| 431 | 103A |
| 418 and 417 | 121A |
| 424 and 423 | 122A |
| 420 and 419 and 500 | 119A |
| 421 and 422 and 500 | 120A |
| 409, 407 and 403 | 117A |
| 410, 408 and 404 | 116A |
| 426, 428 and 432 | 113A |
| 427, 429 and 433 | 114A |
| 425 | 112A |

Figure 5:
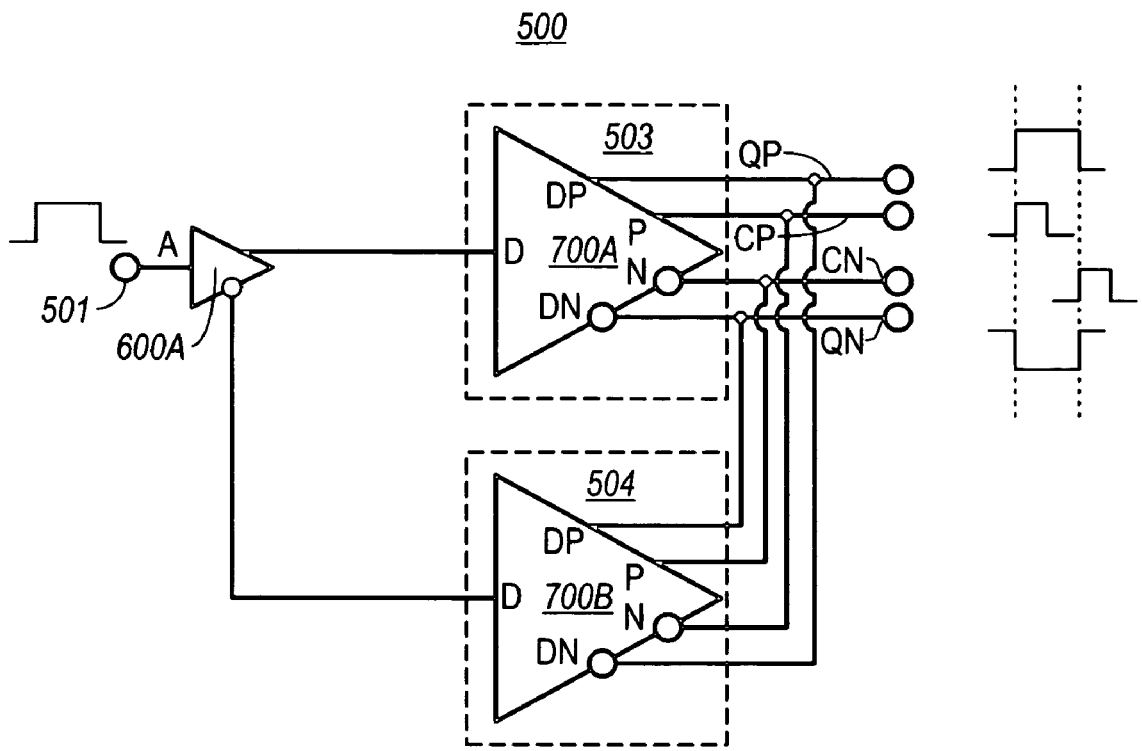
FIG. 5 illustrates an embodiment of a differential signal generation circuit suitable for use as the differential signal generation circuit of FIG. 4.
Figure 7:
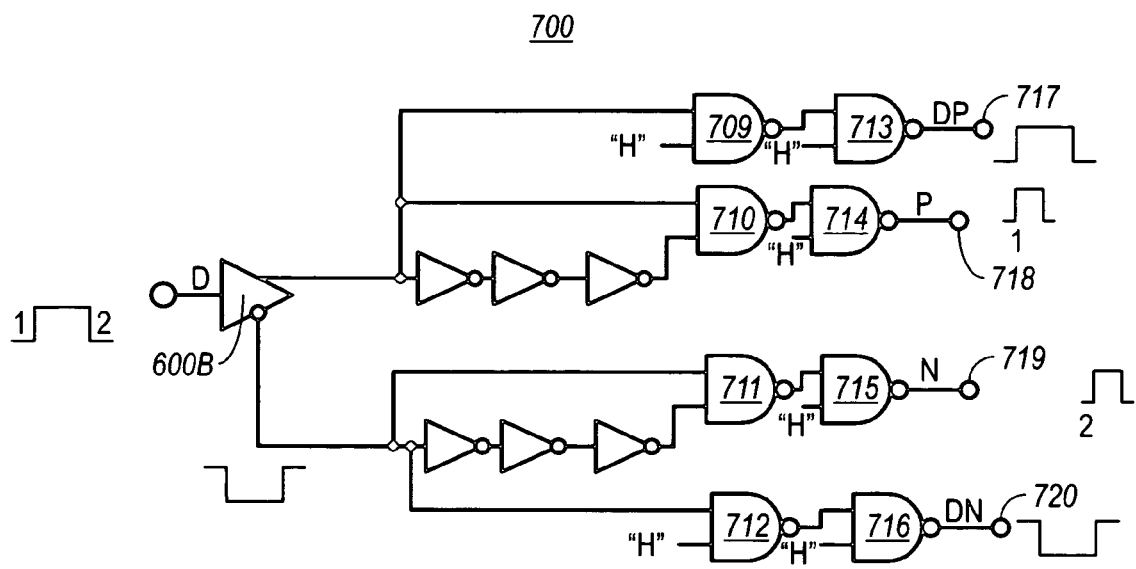
FIG. 7 illustrates a balanced single-ended pre-emphasis circuit that may be used as the signal-ended pre-emphasis circuit of FIG. 5.
Figure 8:
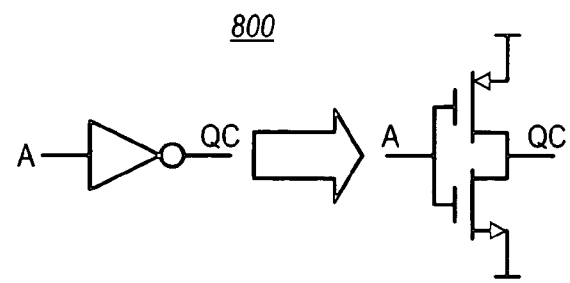
FIG. 8 illustrates a transistor-level circuit diagram of an inverter that may be used for the inverters of FIG. 4, 6 or 7.

FIG. 5 illustrates the pre-driver circuit 500 in further detail. The pre-driver circuit uses two balanced-single-ended block 503 and 504 of circuit 700 described and illustrated with respect to FIG. 7. The circuit 600A is an instance of circuit 600 of FIG. 6. The circuits 700A and 700B are each instances of circuit 700 of FIG. 7. FIG. 8 illustrates an instance 800 of the invertors illustrated in FIGS. 4, 6 and 7. The pre-driver circuit 500 generates the differential input signals QP and QN, as well as the current-aided pre-emphasis control signals CN and CP using a data signal 501. The pre-driver circuit 500 generates exceptionally sharp edges in the output signals QP and QN and operates rail-to-rail. This fast edge is fed forward into the transitioning of the differential output voltage across nodes 430 and 431. Furthermore, the leading edges of the current-aided pre-emphasis control signals CN and CP are automatically aligned with the leading edges of the differential input signals QN and QP, respectively.

Figure 6:
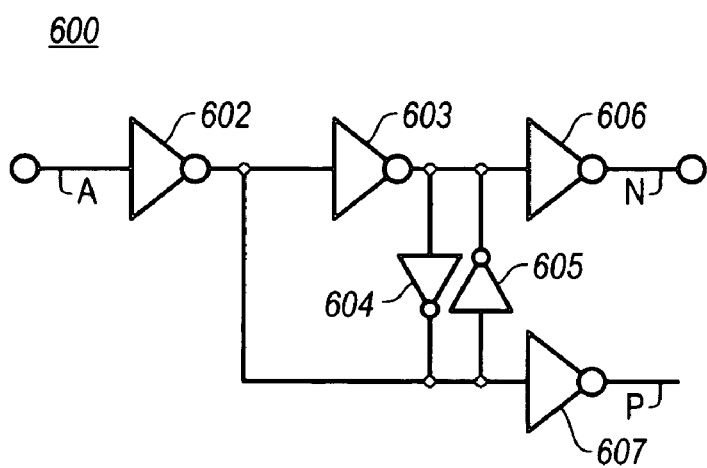
FIG. 6 illustrates a rail-to-rail differential signal generator circuit that may be used as the rail-to-rail differential signal generator circuit of FIG. 5 or 7.

Referring to FIG. 5, since the composite output signals QP, QN, CP, and CN are each a combination of one output from circuit 700A and one output from an identical circuit 700B, the signals QP, QN, CP and CN have a symmetrical rise and fall delay. FIG. 7 illustrates a balanced single-ended circuit 700 that generates each component signal DP, P, N and DN. The data paths A to DP or DN and the pre-emphasis paths A to P or N are all balanced. The same logic NAND cell is used for components 709 through 716. The unused second input pins of NAND cells 709, 712 and 713 through 716 are tied to a logic high, and thus each functions as an inverter. The delay path from the rising edge of A to the rising edge of DP goes through the exact same delay elements as the delay path from the rising edge A to the rising edge of the positive pre-emphasis signal at pin P. By the same token, the rising edge of the negative data output at pin DN aligns up with the rising edge of the negative pre-emphasis signal at pin N. FIG. 6 shows a single-ended input to differential-output circuit 600 in which multiple inventors 602 through 607 are configured as shown to generate differential output signals N and P that are aligned in a complimentary fashion, with the rising edge of one signal coinciding closely with the falling edge of the other signal, and vice versa.

Accordingly, a differential voltage signal driver circuit, a current mode logic drive circuit, and a universal differential voltage signal and current mode logic driver circuit has been described. The circuit incorporates advanced pre-emphasis techniques including complimentary and current-aided pre-emphasis. The advanced pre-emphasis permits sharp transitions in the differential output signal, thereby supporting high data rate applications. Such high data rate applications include, but are not limited to, HSTL, SSTL, GTL, and PCI. Additionally, the circuit may be exclusively implemented in CMOS gate-array process if desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A circuit comprising:
   first, second, third and fourth circuit nodes;
   a first current switch controllably coupled to the first circuit node;
   a second current switch controllably coupled to the second circuit node, wherein if a differential signal is applied across the first and second circuit nodes, the first current switch is configured to be closed while the second current switch is open if the differential signal has a first polarity, and the second current switch is configured to be closed while the first current switch is open if the differential signal has a second polarity;
   a current allocation component coupled to the first and second current switches, and configured to allocate current between the first and second current switches such that increasing current is allocated through the first current switch and a first current path between the current allocation component and the first current switch when the first current switch is closed and the second current switch is open until the current allocated through the first current switch reaches a state in which more current passes through the first current switch than the second current switch, and increasing current is allocated through the second current switch and a second current path between the current allocation component and the second current switch when the second current switch is closed and the first current switch is open until the current allocated through the second current switch reaches a state in which more current passes through the second current switch than the first current switch, wherein the third circuit node is in the first current path, and the fourth current node is in the second current path; and
   a first capacitive coupling mechanism at least selectably capacitively coupling the third circuit node and the second circuit node.

2. A circuit in accordance with claim 1, wherein:
   the first circuit node is a first differential input terminal;
   the second circuit node is a second differential input terminal;
   the third circuit node is a first differential output terminal; and
   the fourth circuit node is a second differential output terminal.

3. A circuit in accordance with claim 1, wherein the circuit is a differential voltage signal driver circuit, the current allocation component comprising:
   a first resistor having a first terminal at least indirectly coupled to a voltage source, and having a second terminal coupled to the third circuit node;
   a second resistor having a first terminal at least indirectly coupled to the voltage source, and having a second terminal coupled to the fourth circuit node; and
   a third resistor coupled between the third and fourth circuit nodes.

4. A circuit in accordance with claim 3, further comprising:
   a fourth resistor coupled between the first terminal of the first resistor and the voltage source, and between the first terminal of the second resistor and the voltage source.

5. A circuit in accordance with claim 1, wherein the circuit is a current mode logic driver circuit, the current allocation component comprising:
   a first resistor having a first terminal at least indirectly coupled to a voltage source, and having a second terminal coupled to the third circuit node; and
   a second resistor having a first terminal at least indirectly coupled to the voltage source, and having a second terminal coupled to the fourth circuit node.

6. A circuit in accordance with claim 1, wherein the circuit is a universal differential voltage signal driver circuit and common mode logic driver circuit, the current allocation component comprising:
   a first resistor having a first terminal at least indirectly coupled to a voltage source, and having a second terminal coupled to the third circuit node;
   a second resistor having a first terminal at least indirectly coupled to the voltage source, and having a second terminal coupled to the fourth circuit node; and
   a third resistor selectably coupled between the third and fourth circuit nodes, wherein when the third resistor is selected to be coupled between the third and fourth circuit nodes, the circuit operates as a differential voltage signal driver circuit, and when the third resistor is selected to not be coupled between the third and fourth circuit nodes, the circuit operates as a common mode logic driver circuit.

7. A circuit in accordance with claim 1, wherein the first capacitive coupling mechanism capacitively couples the third circuit node and the second circuit node.

8. A circuit in accordance with claim 7, further comprising:
   a second capacitive coupling mechanism capacitively coupling the third circuit node and the second circuit node.

9. A circuit in accordance with claim 8, further comprising:
a third capacitive coupling mechanism capacitively coupling the fourth circuit node and the first circuit node.

10. A circuit in accordance with claim 9, further comprising:
a fourth capacitive coupling mechanism capacitively coupling the fourth circuit node and the first circuit node.

11. A circuit in accordance with claim 7, further comprising:
a second capacitive coupling mechanism capacitively coupling the fourth circuit node and the first circuit node.

12. A circuit in accordance with claim 1, wherein the first capacitive coupling mechanism selectively capacitively couples the third circuit node and the second circuit node in response to a first configuration setting.

13. A circuit in accordance with claim 12, further comprising:
a second capacitive coupling mechanism selectively capacitively coupling the third circuit node and the second circuit node in response to a second configuration setting.

14. A circuit in accordance with claim 13, further comprising:
a third capacitive coupling mechanism selectively capacitively coupling the fourth circuit node and the first circuit node in response to a third configuration setting.

15. A circuit in accordance with claim 14, further comprising:
a fourth capacitive coupling mechanism selectively capacitively coupling the fourth circuit node and the first circuit node in response to a fourth configuration setting.

16. A circuit in accordance with claim 12, further comprising:
a second capacitive coupling mechanism selectively capacitively coupling the fourth circuit node and the first circuit node in response to a second configuration setting.

17. A circuit in accordance with claim 1, further comprising:
a second capacitive coupling mechanism at least selectably capacitively coupling the third circuit node and the second circuit node.

18. A circuit in accordance with claim 17, further comprising:
a third capacitive coupling mechanism at least selectably capacitively coupling the fourth circuit node and the first circuit node.

19. A circuit in accordance with claim 18, further comprising:
a fourth capacitive coupling mechanism at least selectably capacitively coupling the fourth circuit node and the first circuit node.

20. A circuit in accordance with claim 1, further comprising:
a second capacitive coupling mechanism at least selectably capacitively coupling the fourth circuit node and the first circuit node.

21. A circuit in accordance with claim 1, further comprising:
a differential signal generation circuit configured to apply a differential signal across the first and second circuit nodes.

22. A circuit comprising:
first, second, third and fourth circuit nodes;
a first current switch controllably coupled to the first circuit node;
a second current switch controllably coupled to the second circuit node, wherein if a differential signal is applied across the first and second circuit nodes, the first current switch is configured to be closed while the second current switch is open if the differential signal has a first polarity, and the second current switch is configured to be closed while the first current switch is open if the differential signal has a second polarity;
a current allocation component coupled to the first and second current switches, and configured to allocate current between the first and second current switches such that increasing current is allocated through the first current switch and a first current path between the current allocation component and the first current switch when the first current switch is closed and the second current switch is open until the current allocated through the first current switch reaches a state in which more current passes through the first current switch than the second current switch, and increasing current is allocated through the second current switch and a second current path between the current allocation component and the second current switch when the second current switch is closed and the first current switch is open until the current allocated through the second current switch reaches a state in which more current passes through the second current switch than the first current switch, wherein the third circuit node is in the first current path, and the fourth current node is in the second current path;
a first current-aided pre-emphasis component coupled to the third circuit node and configured such that the current allocation component allocates current through the first current-aided pre-emphasis component during at least a portion of the time that the current allocation component is increasing current allocated through the first current path and through the first current switch.

23. A circuit in accordance with claim 22, wherein:
the first circuit node is a first differential input terminal;
the second circuit node is a second differential input terminal;
the third circuit node is a first differential output terminal; and
the fourth circuit node is a second differential output terminal.

24. A circuit in accordance with claim 22, wherein the circuit is a differential voltage signal driver circuit, the current allocation component comprising:
a first resistor having a first terminal at least indirectly coupled to a voltage source, and having a second terminal coupled to the third circuit node;
a second resistor having a first terminal at least indirectly coupled to the voltage source, and having a second terminal coupled to the fourth circuit node; and
a third resistor coupled between the third and fourth circuit nodes.

25. A circuit in accordance with claim 24, further comprising:
a fourth resistor coupled between the first terminal of the first resistor and the voltage source, and between the first terminal of the second resistor and the voltage source.

26. A circuit in accordance with claim 22, wherein the circuit is a current mode logic driver circuit, the current allocation component comprising:

a first resistor having a first terminal at least indirectly coupled to a voltage source, and having a second terminal coupled to the third circuit node; and a second resistor having a first terminal at least indirectly coupled to the voltage source, and having a second terminal coupled to the fourth circuit node.

27. A circuit in accordance with claim 22, wherein the circuit is a universal differential voltage signal driver circuit and common mode logic driver circuit, the current allocation component comprising:

a first resistor having a first terminal at least indirectly coupled to a voltage source, and having a second terminal coupled to the third circuit node;

a second resistor having a first terminal at least indirectly coupled to the voltage source, and having a second terminal coupled to the fourth circuit node; and a third resistor selectably coupled between the third and fourth circuit nodes, wherein when the third resistor is selected to be coupled between the third and fourth circuit nodes, the circuit operates as a differential voltage signal driver circuit, and when the third resistor is selected to not be coupled between the third and fourth circuit nodes, the circuit operates as a common mode logic driver circuit.

28. A circuit in accordance with claim 22, further comprising:

a second current-aided pre-emphasis component coupled to the fourth circuit node and configured such that the current allocation component allocates current through the second current-aided pre-emphasis component during at least a portion of the time that the current allocation component is increasing current allocated through the second current path and through the second current switch.

29. A circuit in accordance with claim 22, further comprising:

a first capacitive coupling mechanism at least selectably capacitively coupling the third circuit node and the second circuit node.

30. A circuit in accordance with claim 29, further comprising:

a second capacitive coupling mechanism at least selectively capacitively coupling the fourth circuit node and the first circuit node.

31. A circuit in accordance with claim 30, further comprising:

a third capacitive coupling mechanism at least selectably capacitively coupling the fourth circuit node and the first circuit node.

32. A circuit in accordance with claim 31, further comprising:

a fourth capacitive coupling mechanism at least selectably capacitively coupling the fourth circuit node and the first circuit node.

33. A circuit in accordance with claim 29, further comprising:

a second capacitive coupling mechanism at least selectably capacitively coupling the fourth circuit node and the first circuit node.

34. A circuit in accordance with claim 22, further comprising:

a differential signal generation circuit configured to apply a differential signal across the first and second circuit nodes.

\* \* \* \* \*

UNITED STATES PATENT AND TRADEMARK OFFICE
CERTIFICATE OF CORRECTION

PATENT NO. : 7,215,156 B1  
APPLICATION NO. : 11/157403  
DATED : May 8, 2007  
INVENTOR(S) : Li

It is certified that error appears in the above-identified patent and that said Letters Patent is hereby corrected as shown below:

Title Page  
Item 54, Title, change "COMPLIMENTARY" to --COMPLEMENTARY--

Column 1  
Title, line 2, change "COMPLIMENTARY" to --COMPLEMENTARY--  
Line 16, change "complimentary" to --complementary--

Column 3  
Line 63, change "complimentary" to --complementary--

Column 4  
Line 11, change "complimentary" to --complementary--

Column 5  
Line 42, change "100A" to --101A--  
Line 45, change "100A" to --101A--

Column 8  
Line 6, change "complimentary" to --complementary--  
Line 8, change "complimentary" to --complementary--

Column 9  
Line 20, change "112" to --113A--  
Line 21, change "113 and 114" to --114A and 115A--

Column 10  
Line 13, change "complimentary" to --complementary--  
Line 65, change "1011B" to --101B--

Column 11  
Line 3, change "1199B" to --119B--  
Line 57, change "complimentary" to --complementary--

UNITED STATES PATENT AND TRADEMARK OFFICE
CERTIFICATE OF CORRECTION

PATENT NO. : 7,215,156 B1
APPLICATION NO. : 11/157403
DATED : May 8, 2007
INVENTOR(S) : Li

It is certified that error appears in the above-identified patent and that said Letters Patent is hereby corrected as shown below:

Column 13
Line 14, change "inventors" to --inverters--
Line 16, change "complimentary" to --complementary--
Line 23, change "complimentary" to --complementary--

Signed and Sealed this

Tenth Day of June, 2008

JON W. DUDAS
*Director of the United States Patent and Trademark Office*